Jan. 5, 1971 S. J. MacMULLAN ET AL 3,553,712

MULTIPOINT-MULTIBANK RECORDING SYSTEM

Filed Sept. 30, 1968 6 Sheets-Sheet 1

Jan. 5, 1971 S. J. MacMULLAN ET AL 3,553,712

MULTIPOINT-MULTIBANK RECORDING SYSTEM

Filed Sept. 30, 1968 6 Sheets-Sheet 5

United States Patent Office 3,553,712

Patented Jan. 5, 1971

3,553,712

MULTIPOINT-MULTIBANK RECORDING SYSTEM

Samuel J. MacMullan, Flourtown, Kenneth B. Parker, Jr., Norristown, and Albert E. Paschkis, Gwynedd Valley, Pa., assignors to Leeds & Northrup Company, Philadelphia, Pa., a corporation of Pennsylvania Filed Sept. 30, 1968, Ser. No. 763,671
Int. Cl. G01d *5/252, 9/34*
U.S. Cl. 346—34 12 Claims

ABSTRACT OF THE DISCLOSURE

A recording system whereby a multipoint recorder having a recording capability of a fixed number of points is utilized with bank relays for indicating and/or recording many times the number of points the recorder is designed to record. The system employs a single bank-selector switch controlling the bank relays and providing for production of any of several types of records each characteristic of a selected mode of system operation.

BACKGROUND OF THE INVENTION

Systems, such as that disclosed in U.S. Pat. 2,549,401—I. M. Stein et al., use a basic multipoint recorder together with a multiplicity of stepping switches to expand the capability of the recorder many fold. Since that time improved arrangements have been made as disclosed and claimed in patents such as U.S. Pats. 2,564,294; 2,942,471; 3,211,000; and others. Multipoint-multibank recording systems have been found useful for many applications, including flight test recording, logging temperatures in grain storage bin installations, monitoring and logging temperatures in oil refineries, and for many other applications wherein it is desired to monitor, and/or record, and/or sound an alarm, and/or control an expanded or increased number of measured quantities.

While such prior art systems have been very useful and performed satisfactorily for their intended purpose, they were quite complicated to wire during manufacture, and/or installation thereof, and relatively costly.

SUMMARY OF THE INVENTION

In accordance with our invention a recording system is provided having many modes of operation such as continuous logging of all included measured inputs, monitoring of all included measured inputs with logging only when an alarm condition is encountered, and the logging of inputs on demand. Provision is also made for manually resetting the system after an alarm has been energized as a result of a measured input being above or below a preset limit. Means are also provided for the omission of banks of inputs when so desired, for advancing from one bank to another manually, or for manual selection of a single point to be monitored.

A system in accordance with this invention is characterized by a multipoint recorder having a point-selector switch cyclically operating in synchronism with chart marking means of the recorder, a bank selector switch and a plurality of banks of relays with each relay in a bank in turn energized in a sequence through a path determined by a cycle of operation of the point-selector switch and a path through the bank-selector switch which is common for all relays of a corresponding bank thereby to record on a recorder chart, marks, the positions of which are a function of a measured quantity and additionally a mark indicative of the bank of measured inputs being recorded.

This invention is further characterized by means for recording bank identification together with the measured inputs of a bank as a group for each bank so that the information recorded for each bank is readily identified.

It is further a feature of this invention to provide bank isolation circuits so that any erroneously closed input relays may be more easily located.

It is still another feature of this invention to provide a sensing circuit which for one or more selectable modes of operation is effective positively to initiate recording when an alarm condition is encountered during monitoring of the measured inputs.

It is also a feature of this invention to initiate and terminate recording upon selection of a "Log On Demand" by means of selected paths through said bank-selector switch as determined by circuit conditions established at said bank-selector switch by said point-selector switch.

In the practice of our invention we prefer to employ a multipoint recorder such as disclosed, for example, in U.S. Pats. 3,195,141—R. N. Brown et al.; 3,295,140—K. B. Parker, Jr. et al.; 3,316,554—K. B. Parker, Jr. et al.; and 3,317,913—A. E. Paschkis, having a printwheel of the type capable of printing a number of points such as one to twelve for a single rotation and when tilted to another position may print an additional twelve points which may be numbered thirteen to twenty-four. A recorder of the preferred type includes a multiplicity of printed circuit modules, some with plug-in relays connected together by means of prewired cables having plug-in connectors, and a printed circuit switch, etc., all as clearly described in the aforementioned patents together with an improved transfer relay system as disclosed and claimed in U.S. Pat. 3,396,404—K. B. Parker, Jr.

BRIEF DESCRIPTION OF DRAWINGS

For an understanding of applicants' invention the following specification and claims should be read while referring to the accompanying drawings wherein:

DESCRIPTION OF PREFERRED EMBODIMENTS

Figure 1A:
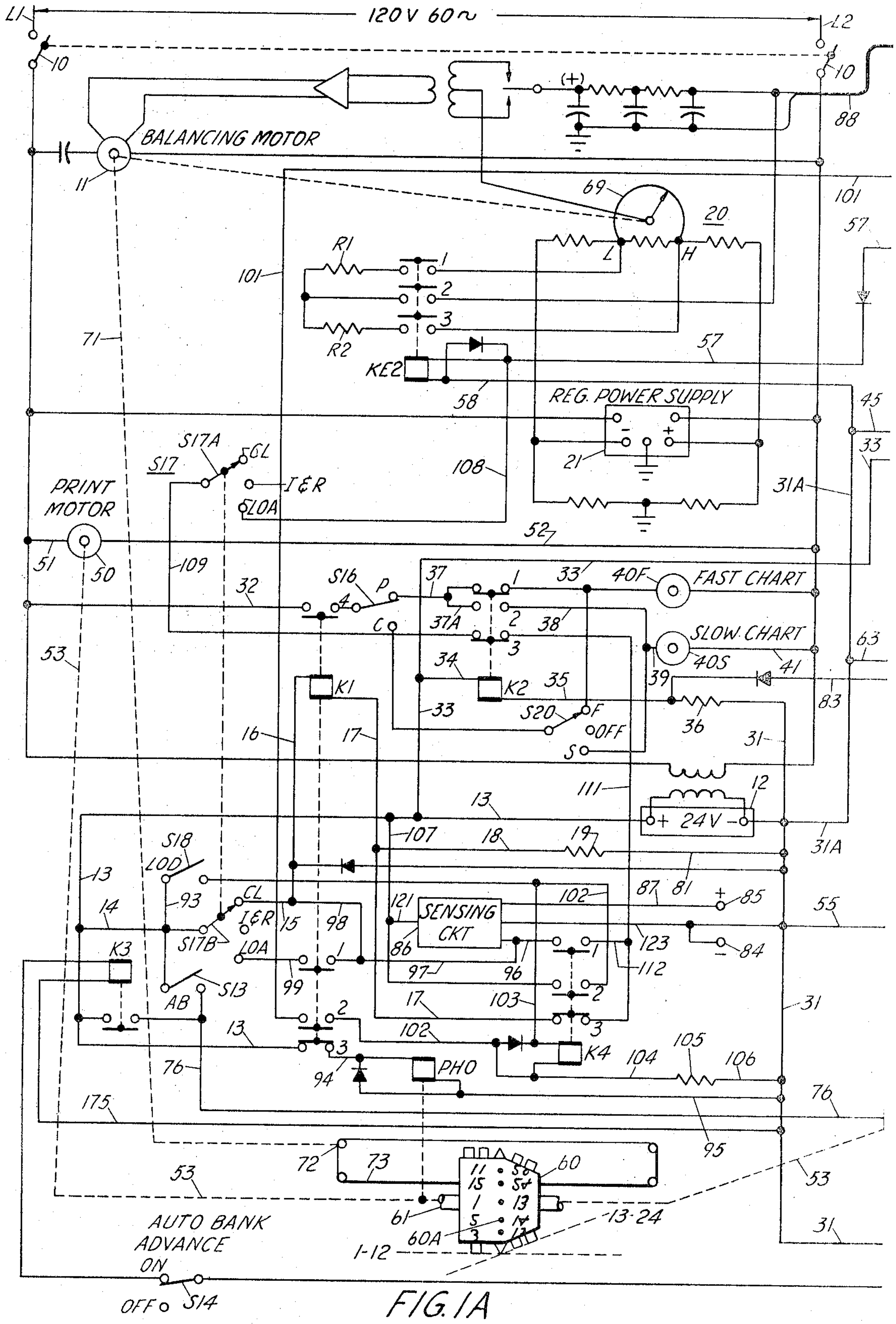
FIGS. 1A, 1B and 1C are parts of an electric circuit diagram illustrative of applicants' invention.
Figure 1B:
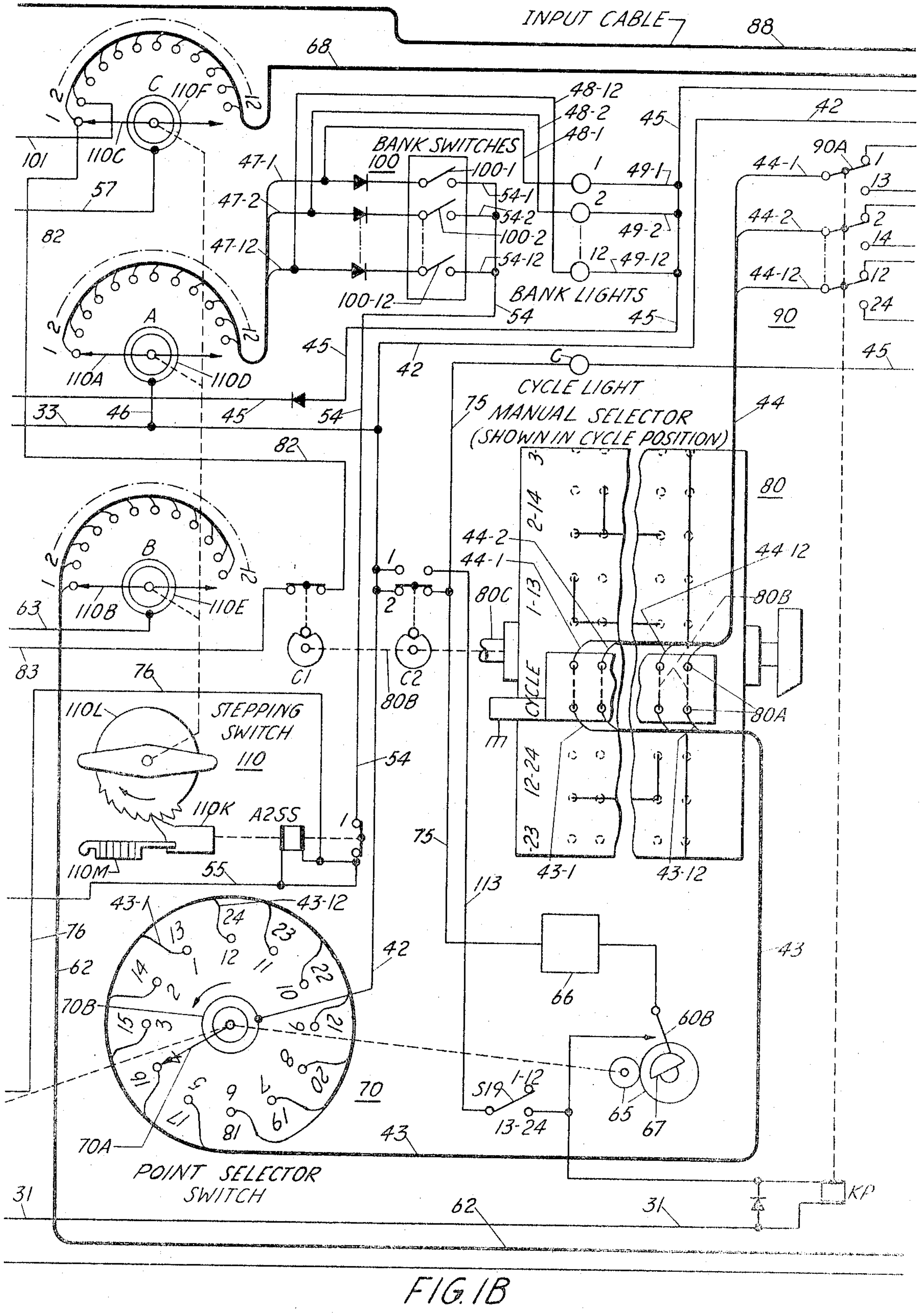
Figure 1C:
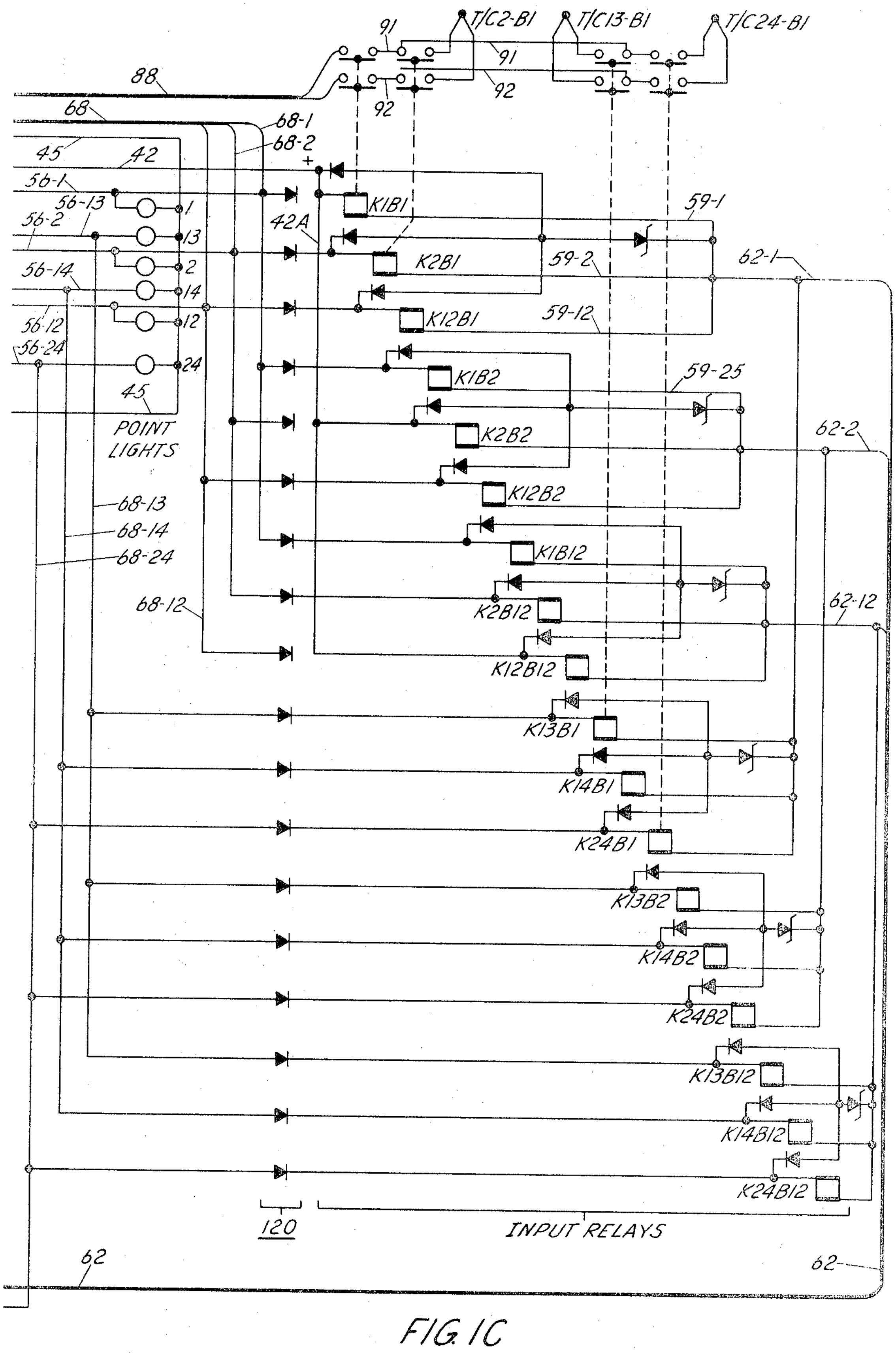
Figure 2:
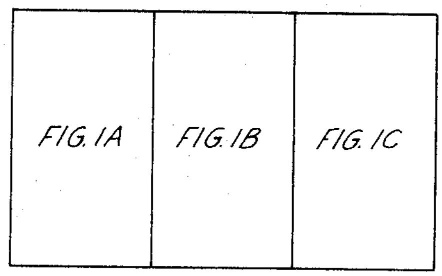
FIG. 2 shows how FIGS. 1A, 1B and 1C should be arranged in order that the diagram will be complete.

Referring to the complete wiring diagram as comprised of FIGS. 1A, 1B and 1C assembled as shown in FIG. 2, all relays are shown in their deenergized state and a line switch 10 for connecting the system to a suitable source of power such as a 120 volt, 50 or 60 cycle system is shown open. If it be desired to continuously log all of the measured points a manually operable switch S17 having wafers S17A and S17B will be set to its continuous log position "CL," a manually operable switch S16 will preferably be set to its "P," pulse chart, position, an Automatic Bank Advance switch S14 will be set to its "ON" position, all of the manually operable switches 100–1 to 100–12 of a Bank switch 100 will be opened so that all banks will be included, and the manually operable Selector switch 80 will be set to its "CYCLE" position at which time cam operated switches C1 and C2, driven by a mechanical connection indicated by dotted line 80B extending from the shaft 80C of switch 80, will be in the positions shown.

Closure of the line switch 10 applies power from lines L1–L2 to the entire system, hence one winding of the balancing motor 11 of a recorder measuring circuit 20, the print motor 50 of the recorder, the regulated power supply 21 for the measuring circuit, and a 24-volt D.C. power supply 12 will all be energized. Since the power supply 12 is energized by the application of power to the system, this also results in energization of a relay K1 through a conductor 13 connected to the plus side of the 24-volt D.C. power supply 12, a conductor 14, the blade of switch S17B, conductor 15, conductor 16, the coil of the K1 relay, conductor 17, conductor 18, resistor 19, conductor 81, conductor 31, and conductor 31A which is connected to the negative side of power supply 12. Energization of the K1 relay moves all of its contacts from the positions shown so that contacts 1, 2, and 4 close and contact number 3 opens.

Energization of the power supply 12 also results in energization of a relay K2 through a circuit which may be traced from the plus side of the 24-volt power supply 12, conductor 13, a conductor 33, conductor 34, the coil of the K2 relay, and then by way of a conductor 35 through a resistor 36, conductor 31 and conductor 31A to the negative side of supply 12. Energization of the 22 relay changes the state of its contacts from that shown so that contacts 2 will be closed and the 1 and 3 contacts open. Energization of the K2 relay with a switch S16 in the position shown, i.e. closed on the "P" (pulse chart) position, results in energization of the slow chart drive motor 40S through a path which may be traced from line L1 conductor 32, the now closed number 4 contacts of the relay K1, the blade of switch S16, conductors 37 and 37A, the number 2 contacts of the K2 relay, a conductor 38, a conductor 39, the windings of motor 40S, and conductor 41 connected to L2.

Closure of the line switch 10 additionally energizes the print motor 50 by means of a circuit which may be traced from L1 through conductor 51, the windings of motor 50, and conductor 52 which is connected to L2. As is indicated by the dotted mechanical connection 53, the print motor moves the printwheel 60 in a manner clearly set forth in the aforementioned Brown et al. Pat. 3,195,141 and Paschkis Pat. 3,317,913. That is to say, the motor 50 rotates the printwheel 60 about the longitudinal axis of a shaft 61 in order to bring the numbers one after the other into position for printing on the chart, tips the printwheel 60 about its center 60A in order to change from one peripheral set of numbers, for example 1 to 12 to another set such as 13 to 24, and periodically moves the printwheel into and out of printing engagement with the chart. In view of the complete disclosure in the cited patents, it will not be repeated here since it forms no part of the present invention.

As indicated by continuation of the dotted mechanical connection 53 to the point selector switch 70, the print motor moves the wiper 70A of switch 70 over the contacts of the point selector switch 70 in synchronism with rotation of the printwheel 60 about the longitudinal axis of shaft 61. As will clearly be understood from the aforementioned patents, the printwheel may be positioned to print both a dot and a number each time it prints. If we begin at point 1 on the printwheel, a single rotation of the printwheel about the axis of the shaft 61 will result in bringing into alignment for printing dots and the numbers 1 to 12 and the wiper 70A will move over the contacts 1 to 12 during the same interval of time. Upon completion of a cycle of revolution of the printwheel it will be tipped about an axis through its center 60A so that dots and the numbers 13 to 24 will in turn be brought into alignment for a printing operation during the next single revolution of the printwheel 60. During this revolution the wiper 70A of switch 70 will again sweep the twelve contacts of the point selector switch 70 but due to operation of a switch 60B from its open to its closed position the coil KP of a transfer switch 90 will be energized as described in aforementioned U.S. Pats. 3,317,913 and 3,396,404 so that the brush 70A will establish connections by way of manual selector switch 80 in its cycle position, the contacts of the transfer switch 90 through twelve other conductors representative of points 13 to 24. This latter recorder feature has been described in the aforementioned patents so the description will not be repeated here since it per se is not a part of the present invention.

With the various switches set for operation of the system for continuous log at a slow recorder chart speed, bank identification and the inputs to the measuring circuit 20 are automatically effected in the following manner. A conductive path exists from the plus terminal of the 24-volt power supply 12 to the output terminals of a transfer switch 90 by way of a conductor 13, conductor 33, conductor 42, the commutator ring 70B of the point selector switch 70. The wiper 70A thereafter establishes electrical connection sequentially through the twelve contacts of switch 70 which are connected via a cable 43 to the brushes 80A of a manually positioned drum switch 80. When the drum switch 80 is set to its cycle position, straight through connections are established by way of two parallel sets of twelve brushes 80A and a group of twelve parallel conductive paths, indicated by the dotted lines 80B, of the printed circuit contact pattern of drum switch 80 from the conductors 43–1 to 43–12 of a cable 43 to conductors 44–1 to 44–12 which are connected to the blades 90A of transfer switch 90 which is at proper times operated from its 1 to 12 state to its 13 to 24 state by the KP relay as mentioned earlier. The elements for points 3–11 and 15–23 have been omitted to avoid needless repetition.

Setting the drum switch 80 in its cycle position established a circuit from the positive side of power supply 12 by way of conductors 13, 33, the lower portion of conductor 42, the closed contacts of switch C2, the upper portion of conductor 75, the cycle light, conductors 45, and 31A connected to the negative terminal of supply 12 to light the cycle light.

If it be assumed that the transfer switch 90 is as shown in the 1 to 12 position and that wiper 70A is on point 1 of switch 70, the plus of the 24-volt power supply 12 is connected from the commutator ring 70B through wiper arm 70A, point 1 of switch 70, conductor 43–1 of cable 43, a brush 80A, the conductive path 80B, a brush 80, conductor 44–1 of cable 44, blade 90A, to point 1 of the transfer switch 90. From the foregoing it will be apparent that as the wiper 70A progresses from point 1 of switch 70 to points 2, 3, etc., the plus of the 24-volt power supply 12 will in turn be connected to corresponding points of the transfer switch 90. In order to conserve space, points 3 to 11 inclusive of the transfer switch 90 and points 3 to 11 inclusive of a bank switch 100, bank lights for banks 3 to 11 and all point lights 3 to 11 and 15 to 23 have been omitted from the drawings since they merely duplicate the material illustrated.

As will be known to those skilled in the art in a multi-point-multibank system of indicating and recording, it is customary to identify a specific input by means of a number and a corresponding lamp providing bank identification in association with a number and a lamp which provides point identification within the particular bank. This is best understood by reference to FIG. 5 where the lighted lamps are indicated by short radial lines for the cycle light and the lights for bank 9 and point 13. In the present system provision is made for 12 banks which are identified on the chart of the recorder by using input point 1 of bank 1 with associated circuitry to effect a printed identification of bank 1, input point 2 of bank 2 with associated circuitry for printing the identification for bank 2, etc., so that with the twelve banks and following the same arrangement, input point 12 of bank 12 is utilized with associated circuitry for printing the identification for bank 12.

In accordance with applicants' invention by the use of a single stepping switch 110 and a diode matrix 120 in the energizing circuits of an arrangement of relays, bank identification signals and signals for each measured quantity are fed to the measuring circuit 20 of a multipoint recorder. The diodes are included at the proper points in the circuitry to prevent the flow of currents where current flow must be avoided. Since some input points are used for bank identification these points are not available for use to supply input information from a transducer, responding to a condition to be measured, to the measuring circuit. In accordance with this invention when the wipers 110A, 110B, and 110C of wafers A, B and C of a stepping switch 110 are in their bank 1 positions and transfer switch 90 in in the point 1 to 12 state, as shown, the circuitry for a group of relays K1B1 to K1B12 which comprise half of bank 1 is utilized to provide input information to the multipoint recorder and related circuits are established.

With wiper 70A of switch 70 on point 1, switch 80 set on cycle, switch 90 in its 1 to 12 position and the wipers of switch 110 in bank 1 position, point 1 of the transfer switch is not utilized to connect an input to the recorder as will be evident by the fact that a conductor 56–1 from point 1 of the transfer switch is open circuited at the right side of a diode of a diode matrix 120. At this time an electrical connection is not established to the coil of a K1B1 relay through this path; however, relay K1B1 is continuously energized during operation of the system on bank 1 by application of +24 v. from supply 12 via conductors 13, 33, and the upper portion of conductor 42, the coil of relay K1B1, conductors 59–1, 62–1 of cable 62, a bank 1 contact on wafer B of stepping switch 110, the wiper 110B, commutator ring 110E, and conductors 63 and 31A to the negative terminal of supply 12 for reasons later to be described. Plus voltage from the 24-volt power supply 12 which exists at point 1 of the transfer switch 90 effects a current flow by way of a branch of conductor 56–1, through the point 1 light and thence through a conductor 45, and conductor 31A, which is connected to the negative side of the 24-volt power supply. This lights the number 1 point light.

The path for energization of a bank 1 identification light is from the plus side of the 24-volt supply 12, conductor 13, conductor 33, conductor 46, commutator ring 110D of wafer A of the Stepping Switch 110, wiper 110A to point 1 of wafer A, conductor 47–1 of cable 47, conductor 48–1, the number 1 bank light, conductor 49–1, conductor 45, and conductor 31A which is connected to the minus side of the power supply 12. From the foregoing it will be clear that the number 1 point light and number 1 bank light are both illuminated.

When a continuous log is being made of all of the measured quantities connected in the system it is also necessary to provide for bank identification on the chart of the recorder. As has already been described when the selector switch wiper 70A is on point 1 and the transfer switch 90 is in the 1 to 12 position the plus terminal of the power supply 12 is connected to blade 90A and thus to the number 1 terminal of the transfer switch 90.

By means of a conductor 68–1 of cable 68 a conductive path is established to point 1 of wafer C of the stepping switch 110. From this point a conductive path is established through a conductor 82, the closed contacts of cam operated switch C1, and a conductor 83, to a point on conductor 35 between the coil of the K2 relay and resistor 36. This applies the 24-volt positive potential in a manner to deenergize the K2 relay thus permitting it to return to the position shown in the drawings, that is to say, contacts 1 and 3 are closed and the number 2 contacts are opened thereby to deenergize the slow chart motor 40S and energize the fast chart motor 40F. This produces a momentary fast operation of the recorder chart each time point 1 of wafer C is energized for reasons later to be described.

Figure 4:
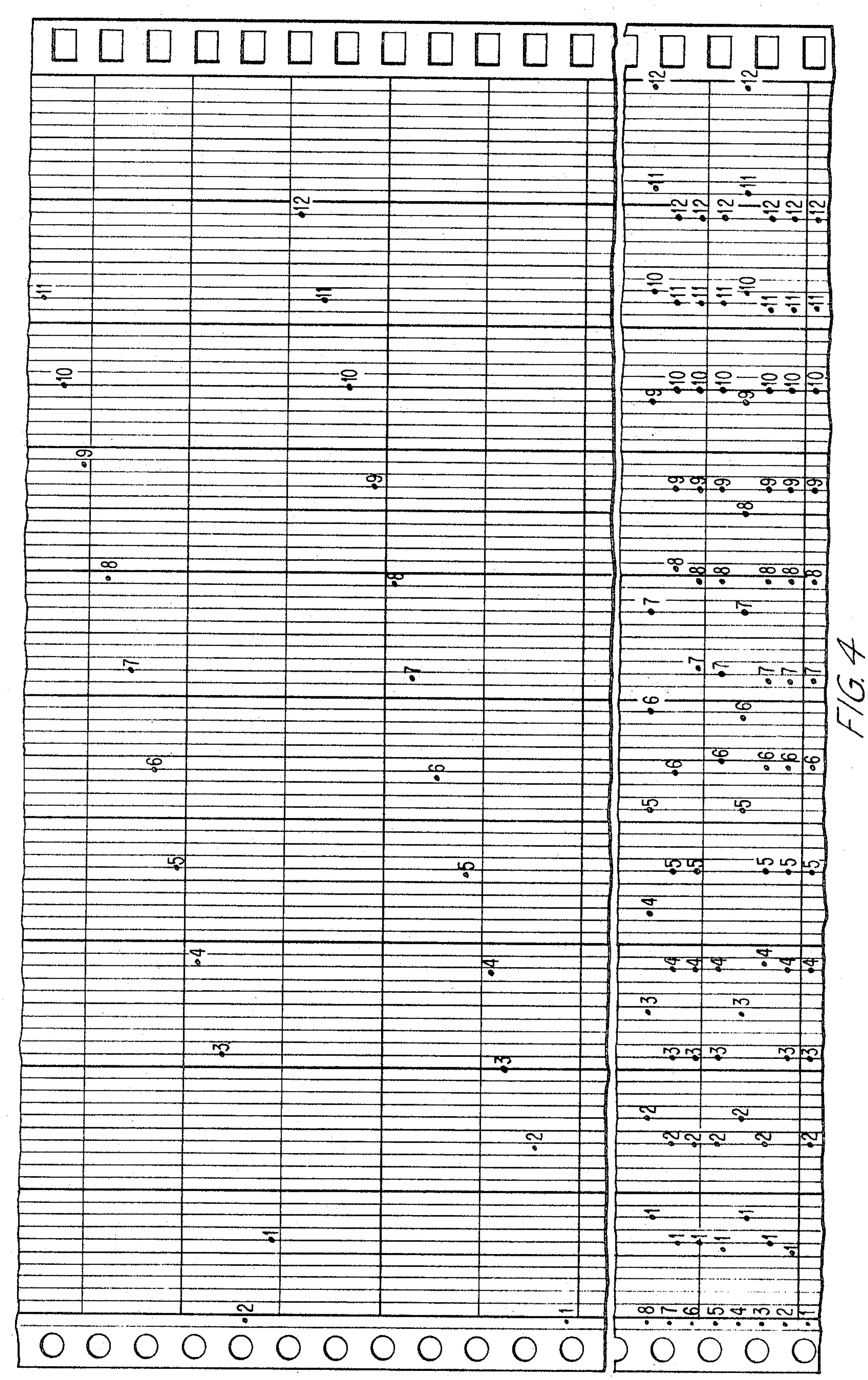
FIG. 4 is illustrative of a section of the record produced on a strip chart by a recorder operating in accordance with applicants' invention.

Additionally, when point 1 of wafer C of the stepping switch 110 is energized, there is also established a path through wiper 110C, commutator ring 110F, and a conductor 57, to the coil of a KE2 relay, and from the coil the path continues by way of conductor 58, and conductor 31A to the negative side of power supply 12. This results in energization of the KE2 relay causing all of its contacts 1, 2, and 3 to close placing R1 and R2 in circuit across slidewire 69. By this means a parallel resistance path is placed in shunt with the slidewire 69 of measuring circuit 20 to produce a signal which will drive the balancing motor 11 to position the slidewire contact at about 1% along the length thereof in order to rebalance the measuring circuit 20. At the same time the balancing motor through a mechanical connection 71 drives a pulley 72 to move cable 73 in a manner to position the printwheel 60 at about 1% of scale. The timed operation of the print motor is such that after the recorder has been balanced the printwheel is brought into chart marking engagement with the recorder chart not shown thus to print the number 1 at the 1% location along the chart thus to identify the bank for those points which follow (see FIG. 4).

Subsequent to printing, continued rotation of the print motor rotates the printwheel 60 in a manner to bring the number 2 into position for printing on the chart at the proper time in the print cycle and simultaneously move the wiper 70A to point number 2 on point selector switch 70. This results in removal of the positive potential from point 1 of the transfer switch 90 and application of the positive 24 volt potential of the power supply 12 to point number 2 on the transfer switch.

Removing the positive potential from point number 1 of the transfer switch also removes it from point number 1 of wafer C of the switch 110. This removes the potential from the point on conductor 35 between the coil of the K2 relay and the resistor 36, thus to reenergize relay K2 causing its contacts to move from the positions shown thereby opening the number 1 and number 3 contacts and closing the number 2 contacts. This deenergizes the fast chart motor 40F and energizes the slow chart motor 40S so that all of the points in bank 1 will be printed on the chart along substantially the same line. With control of the K2 relay through point 1 of wafer C of switch 110 the momentary increase of chart speed will be effected each time point 1 is energized for any bank. With each bank advance, switching to point 1 of the next bank energizes the fast chart motor in a manner described above for a short interval of time; thus the records for each bank are effectively separated and the number of the bank will be printed at the 1% point even though point numbers precede it and follow it as is the case for all banks between banks 1 and 12. For bank 1 the bank identification number is first and for bank 12 the bank number is printed last. If the contacts of any other relay in a bank are closed at the time of bank identification, means later described are provided to detect the condition.

When the positive potential is applied to point 2 of the transfer switch, the positive potential is applied to conductor 56–2 and through the diode of the diode matrix 120 to the coil of the K2B1 relay and from this relay a conductive path is provided through conductor 59–2, conductor 62–1 of cable 62, to point 1 of wafer B of the stepping switch 110 which is still in the number 1 position. The path continues through the wiper 110B, the commutator ring 110E, conductor 63, and conductor 31A to the negative side of the 24-volt power supply. This results in energization of the K2B1 relay which effects closure of its normally open contacts resulting in application of an input from T/C 2–B1 to the measuring circuit 20 of the recorder by way of the now closed contacts of the K2B1 relay, conductors 91 and 92, the closed contacts of the K1B1 relay, which remains energized during measurement of all points on bank number 1 as mentioned above, and the input cable 88. This input will result in a balancing operation of the measuring circuit and subsequent printing of the measured value on the recorder chart in a manner clearly understood by those skilled in the art. At the same time through a path similar to that previously described, the number 2 point light is energized and the number 1 bank light remain energized by means of circuits described above. From the foregoing it is apparent that continued operation of the recorder will result in the measuring and recording of the remaining points 3 to 12 during which time the number 1 bank light remains lit and the point lights become illuminated and extinguished as the recorder operation continues from point to point.

As described in U.S. Pat. 3,317,913, upon completion of a recording of point 12 the recorder mechanism effects tipping of the printwheel 60 from the position which resulted in printing of the numbers 1 to 12 to a position which will result in printing of the numbers 13 to 24. At the same time, and preferably under the control of a timing circuit 66 like that described in aforementioned Pat. 3,396,404, switch 60B is closed by means of cam structure 67 which is driven in timed relation with rotation of the printwheel 60 and point selector switch 70 by way of mechanical connection 64 and gears 65. Closure of switch 60B establishes an energizing circuit for energizing the coil KP of the transfer switch 90. This circuit including switch 60B extends from the plus terminal of supply 12 by way of conductors 13, 33, 42; the closed contacts of switch C2, the lower portion of conductor 75, timing circuit 66, closed switch 60B, the coil KP, and conductors 31, and 31A to the negative terminal of power supply 12. Energization of the KP coil moves all of the switch blades 90A to their lowermost position to connect conductors 44–1 to 44–12 inclusive to contacts 13 to 24 inclusive of switch 90. Thereafter continued movement of wiper 70A reestablishes connections on point 1 of the print selector switch 70 which iinsofar as operation of the recorder is concerned becomes point 13. The subsequent revolution of wiper 70A is sequence connects points 13 to 24 to the corresponding contacts of the transfer switch through the same conductors utilized for connection of points 1 to 12 to the transfer switch. It will now be apparent that the K13B1 to K24B1 input relays will be energized in sequence through paths comprised of conductors 56–13, 56–14 to 56–24 and conductors 68–13, 68–14 to 68–24 in the same manner as were the relays for points 1 to 12. The point lights are energized one-by-one as the rotary selector switch travels over points 13 to 24 and the number 1 bank light remains energized. The inputs to the recorder for points 3 to 24 are sequentially applied to the measuring circuit 20 in the same manner as described above for point 2. In each instance the inputs from all points 2 to 24 of bank number 1 are applied by way of conductors 91 and 92, the closed contacts of the K1B1 relay and the conductors of cable 88. Hence, if the contacts of any of the bank 1 relays are closed at the time of bank idenification, the bank identification will be printed upscale from the point determined by resistors R1 and R2 of measuring circuit 20 by an amount which is a function of the span and zero of the recorder. Thus by means of the circuit described, all of the inputs from bank 1 relays are effectively isolated in a group from all other inputs. The foregoing circuit arrangement makes it easier to locate a relay stuck in the closed position. The circuits for the remaining banks are like those for bank 1 except that for each bank the bank isolation as described immediately above is effected through the input selector relay associated with the bank identification point, such as K2B2 and K12B12 shown on FIG. 1C, hence these will not be described.

Upon arrival at point 24 of any bank the positive voltage applied at point 24 of the transfer switch 90 not only energizes the K24 relay corresponding with that bank but, through a path comprised of a continuation of conductor 68–24, the contacts of closed switch S14, the coil of the K3 relay, conductors 175, 31 and 31A to the negative terminal of the 24-volt power supply 12 energizes the coil of the K3 relay. This causes the contacts of this relay to close thus establishing a circuit from the plus terminal of power supply 12 through conductor 13, the closed contacts of the K3 relay, conductor 76, the coil of the A2SS relay, and conductors 55, 31 and 31A to the minus terminal of the power supply 12 to energize the A2SS relay. Energization of the A2SS relay of stepping switch 110 opens the number 1 contacts of this relay and at the same time moves a dog 110K to the right so that it drops into the next tooth of ratchet 110L thus cocking the stepping switch for stepping. Continued movement of wiper arm 70A from point 24 to point 1 opens the energizing circuit to the K3 relay causing it to revert to the position shown thus breaking the energizing circuit to the coil of the A2SS relay so that contacts 1 of this relay and the dog 110K return to their original positions due to the tension of a spring 110M. Return of the parts of the A2SS relay to the positions shown rotates stepping switch 110 one step in the direction of the arrow on the ratchet wheel 110L and moves the wiper arms 110A, 110B, and 110C to point 2 of the respective switch wafers. At the same time switch 60B will return to the position shown thus deenergizing the coil KP of transfer switch 90 so that transfer switch 90 returns to the position shown in the drawings. As a result, the system is now set up for logging information from the points of bank 2. Since the operation of the system is the same for each bank, further description thereof is believed unnecessary.

If a system of only 12 points per bank is adequate, it should be understood that the transfer switch 90 and the recorder operated switch 60 and associated circuitry would all be omitted; and the conductors of cable 44 connected directly to the conductors 56–1 to 56–12 inclusive; and the equipment for relays K13B1 to K24B1, K13B2 to K24B2, etc., to K13B12 to K24B12 would likewise be omitted.

At any time that it is desired to omit an entire bank, bank switches 100 are provided. These switches are each manually operated switches 100–1 to 100–12. Closure of any of these switches establishes a circuit from the commutator ring 110D of wafer A of switch 110, through the wiper arm 110A, the point on the wafer which corresponds to the closed switch, the appropriate one of conductors 47–1 to 47–12 of cable 47, the closed switch of switches 100, and by way of the appropriate one of conductors 54–1 to 54–12, conductor 54, the closed contacts 1 of the A2SS relay, the coil of the A2SS relay and from the coil of the A2SS relay through conductors 55, 31 and 31A to the negative terminal of the supply 12. This results in energization of the A2SS relay which moves the dog 110K to the right for engagement with the next tooth on ratchet wheel 110L and simultaneously opens the number 1 contacts of the relay, thus immediately deenergizing the relay. The spring 110M which biases the dog and contact of the relay to the left returns them to the positions shown upon deenergization of the coil thus advancing the stepping switch one step and deenergizing the relay coil. The net result is a rapid stepping of the stepping switch to omit a bank for which the corresponding bank switch 100 is closed upon arrival of the stepping switch wiper arm 110A at the contact for that bank.

If it be desired rapidly to advance from one bank to another, there is provided a switch S13 labeled AB (advance bank). This is a spring return normaly open switch. Momentary closure of switch S13 will establish a circuit from the positive terminal of power supply 12 by way of conductors 13, 14, 93, switch S13, conductor 76, the coil of the A2SS relay, and conductors 55, 31, and 31A to the negative side of power supply 12. This will effect a single operation of the stepping switch 110 to advance to the next bank. Thus, by means of switch S14 the stepping switch 110 may be rapidly moved to any position to select any bank. Bank advance may be effected by means of the switch S13 whether or not the switch S14 is on or off its automatic bank advance position. However, if switch S14 is in the "OFF" position, a bank advance can only be effected by switch S13.

If during the logging of measured quantities it be desired to space the points as printed along the length of the recorder chart, the switch 16 may be transferred to its C (continuous) position and either a slow or fast chart speed selected by means of the switch S20.

In the aforementioned U.S. Pat. 3,295,140 there are described control-commutator relays KC1, KC2, et seq; a group of lock-in relays KL1, KL2, et seq; a group of switches 23A, 23B, et seq; operated by cams 24A, 24B, et seq; and associated circuitry for establishing alarm and/or control circuits. These same control and alarm features may be utilized with the system of the present invention to provide alarm and/or control functions for each bank of inputs. Since the manner in which these features may be applied to the system of the present invention will be clear to those skilled in the art from the disclosure of U.S. Pat. 3,295,140, it will not be described here, as it forms no part of the present invention.

As disclosed in Pat. 3,295,140, circuitry for energizing an alarm upon deviation of an input above or below a selected value will result in closure of a pair of contacts thereby to energize a lock-in relay to sound an alarm. In the system of the present invention when this occurs, the sensing circuit 86 shown in FIG. 1A as a rectangle is capable of producing an output to initiate logging of the inputs. When it is desired to have the recorder print a record only upon occurrence of an alarm condition, the switch blades S17A and S17B are moved to the LOA (log on alarm) position. The remainder of the switches may be left in the positions shown. With this setting the only relay energized will be the K2 relay which will open its number 1 and 3 contacts and close its number 2 contacts thereby to operate the recorder chart at slow speed. Since the K1 relay is deenergized and the number 3 contacts thereof closed, a print holdout solenoid PHO is energized through a circuit which may be traced from the positive side of the 24-volt power supply 12 through conductor 13, the normally closed number 3 contacts of the K1 relay, conductor 94, the coil of the PHO relay, and through conductors 95, 31 and 31A to the negative side of the power supply 12. When the print holdout relay is energized, it prevents printing in a manner more fully set forth in aforementioned U.S. Pat. 3,317,913. Nevertheless, since the print motor 50 is continuously energized, the printwheel 60 rotates and the point selector switch wiper on 70A continues to rotate and switch 60B is operated at proper times. In short, the system is completely operable to connect inputs to the system one after another and indicate their value on the recorder scale. When an alarm condition occurs, a positive potential is produced at the output of sensor 86 and applied over a conductive path comprised of conductors 96, 97, 98, and 16 to energize the K1 relay. Energization of this relay effects closure of its number 1, 2 and 4 contacts and opening of its number 3 contacts to deenergize the print holdout solenoid POH to initiate printing. A hold-in circuit for the K1 relay is established over a circuit path which may be traced from the positive terminal of the power supply 12 by way of conductors 13, 14, switch blade S17B, log on alarm contact, conductor 99, the closed number 1 contacts of the K1 relay, and conductors 97, 98 and 16, the coil of the K1 relay and conductors 17, 18, resistor 19, and conductors 81, 31 and 31A to the negative side of the power supply 12. Printing will thereafter continue until the switch blades S17A and S17B are moved to the indicate and reset position thus to interrupt the hold-in circuit of the K1 relay through its number 1 contacts.

When the switch S17 is moved to the "log on alarm" position, the switch blade S17A is moved to the lowermost contact thereby to establish a conductive path from the positive side of the KE2 relay through conductor 108, the now closed switch S17A, conductor 109, the closed number 3 contacts of the K2 relay, which is momentarily deenergized whenever a positive potential is applied to the number 1 point of wafer C of stepping switch 110, conductor 111, the normally closed number 3 contacts of relay K4 and conductor 17 to apply this positive potential to the juncture of conductors 17 and 18 thereby short circuiting the K1 relay coil. From the foregoing it will be apparent that an alarm condition will produce printing beginning with the point alarmed and continue as the wiper 70A sweeps over the contact of the rotary selector switch until the positive potential is applied to point 1 of wafer C of the stepping switch 110 upon completion of the recording of all points of all banks which follow the point alarmed. When the K1 relay coil is shorted as just described, the recorder will then continue to indicate only until an alarmed point is reached.

It is also a feature of the system of this invention to provide a switch S18 designated LOD (Log On Demand). The log on demand switch is a spring return switch, as is the advance bank switch, momentary closure of which establishes a circuit for energization of K4 relay. This circuit may be traced from the positive terminal of power supply 12 by way of conductors 13, 14; the upper branch of 93; switch blade S18; conductors 102, 103; the coil of the K4 relay; conductor 104; resistor 105; and conductors 106, 31 and 31A to the minus side of the power supply 12. Energization of the coil of the K4 relay opens its number 3 contacts and closes its number 1 and number 2 contacts with the number 2 contacts effecting a lock-in circuit which may be traced from the positive side of the power supply 12 through conductors 13, 107; the number 2 contacts of the K4 relay; conductors 102, 103; the coil of the K4 relay; conductor 104; resistor 105; and conductors 106, 31 and 31A to the negative side of supply 12. If it be assumed that the K1 relay is deenergized so that no recording is taking place and an alarm condition does not arise to effect energization and locking-in of the K1 relay by the sensor circuit in the manner just described, the system will continue to indicate until the next occurrence of point number 1, bank number number 1, at which time a circuit is established from point 1 of wafer C of stepping switch 110 to which a positive potential has been applied from the number 1 contact of transfer switch 90 in a manner previously described through the wiper 110C and commutator ring 110F of stepping switch 110 and conductors 57, 108, switch blade 17A, which is in the log on alarm position, conductor 109, the closed number 3 contacts of the K2 relay; (which is deenergized at this particular time through conductor 82, the closed contacts of switch C1, etc., in a manner above described; conductors 111, 112; the closed number 1 contacts of relay K4); conductors 96, 97, 98, 16; the coil of the K1 relay; conductors 17, 18; resistor 19; and conductors 81, 31, and 31A to the negative terminal of power supply 12. As will be apparent from previous description, energization of the K1 relay results in deenergization of the print hold out solenoid by opening of the number 3 contacts of the K1 relay so that printing will begin. The K1 coil will lock in through its number 1 contacts until subsequently deenergized upon completion of the logging of all points. When the wiper 70A of the point selector switch 70 contacts point 2, a positive potential will be applied to point 2 of wafer C of the stepping switch in a manner previously described; that is to say from point 2 of the transfer switch 90 by way of conductor 68–2. This positive potential is applied by way of conductor 101; the number 2 contacts of the K1 relay; and conductor 102 to a point between the coil of the K4 relay along conductor 104 and the resistor 105. This shorts out the coil of the K4 relay causing its contacts to open thus breaking its holding circuit through the number 2 contacts. Thereafter the system continues to record making a complete traverse of all included points of all banks upon completion of which it will arrive at point 1, bank 1, at which time the positive potential applied to point 1 of wafer C of the stepping switch 110 is likewise applied by way of the switch wiper 110C; commutator ring 110F; conductors 57, 108; the blade S17A closed on contact for a "Log On Alarm"; conductor 109; the closed number 3 contacts of the K2 relay which is deenergized at this time; conductors 111; the number 3 contacts of the K4 relay; and the lower portion of conductor 17 which is connected to the negative side of the coil of the K1 relay thus to short out the coil and deenergize the relay. Operation of the system in the manner just described results in the production of a record of all points of all banks connected in the system.

If it be desired to monitor a single point, this may be accomplished as follows: (1) set the Automatic Bank Advance, switch S14, to its "OFF" position; (2) set the Point Selector to the desired point to be monitored and the switch S19 to the position required, i.e., on 1 to 12 for one of the points 1 to 12 or on 13 to 24 for one of the points 13 to 24; and (3) choose the desired bank either by closing all of the switches 100–1 to 100–12 except the switch for the selected bank or pulse the "AB," advance bank switch S13 until the desired bank light is illuminated. Setting of the manual selector switch 80 from its cycle position automatically opens the number 1 contacts and closes the number 2 contacts of the switch C2 which transfers the connection between conductor 42 and conductor 75 to a connection from conductor 42 to conductor 113 thus to extinguish the cycle light, deenergize the timing circuits 66, and complete a conductive path to the blade of switch 19 for use when the blade is closed on the 13–24 contact to energize the coil KP of transfer switch 90.

For continuous logging of a single point with the point selector switch and bank switches adjusted to the point and bank desired in the manner above described, the blades S17A and S17B of the two deck switch S17 will be in the positions shown and operation will be similar to that described for continuous log of all points except for the fact that for all positions of the wiper 70A the manual selector switch 80 will energize only that one of conductors 44–1 to 44–12 of the cable 44 which corresponds to the selected point regardless of bank. Hence, only the corresponding blade 90A of the transfer switch 90 will be effective in placing a positive potential on the corresponding one of the contacts of the transfer switch 90. By this means the selected one of the input relays will be continuously energized and since the K3 relay will never be energized due to the above-mentioned opening of switch S14, no bank advance pulses will be transmitted to relay K3. The recorder will record continuously; however, the point identification printed on the chart will be without meaning as all numbers on the printwheel are recording from the same input. To insure a readable record, the switch S16 should be moved to close its "C" contact for continuous chart advance and the proper chart speed selected by means of switch S20.

Figure 3:
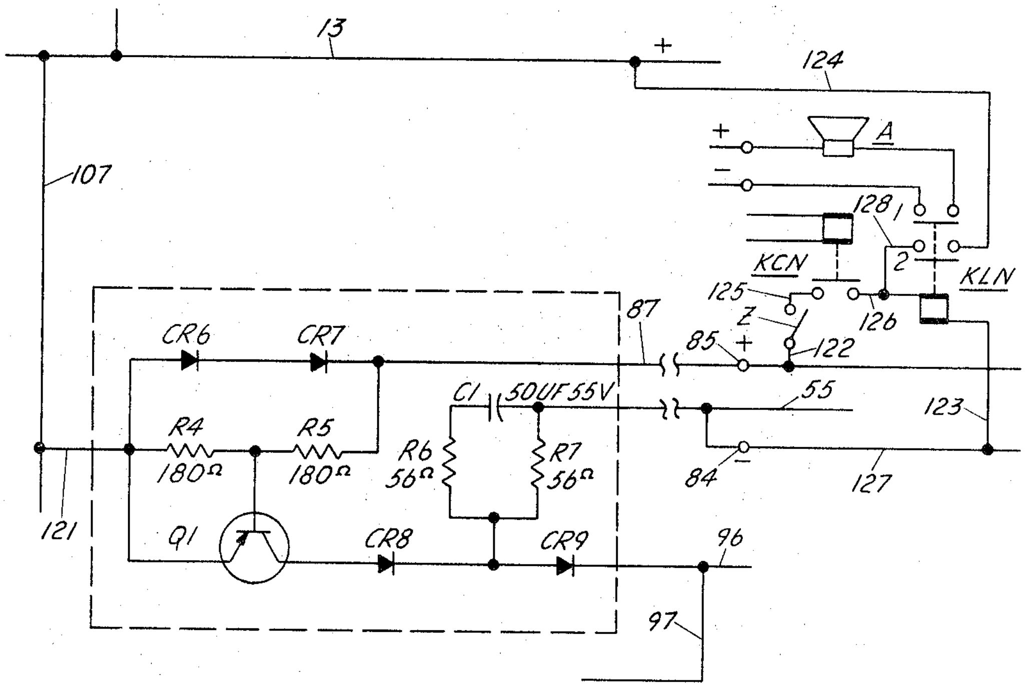
FIG. 3 discloses the details of a sensing circuit having particular utility in connection with applcants' invention.

The operation of the sensing circuit 86 of FIG. 1A will be best understood by referring to FIG. 3. The aforementioned Pat. 3,295,140 describes the use of control-commutator relays and lock-in relays which have already been referrerd to. For purposes of this description a relay KCN of FIG. 3 is representative of any one or more control-commutator relays and the relay KLN is representative of any one or more lock-in relays which may be used to actuate an alarm when a condition, the value of which is being measured, goes above or below a preset value. The KCN relay wil be connected in parallel with one of the bank lights. When a condition being measured is connected to the measuring circuit of the recorder and operates the recorder in a manner to close a switch Z actuated at a preset value of the meausred condition, and the KCN relay is energized thereby to close its contacts the KLN relay becomes energized which, upon closure of its contacts, will energize an alarm device A. The energizing circuit for the KLN relay may be traced by way of the conductor 13, which is shown in FIG. 1A as connected to the plus terminal of the 24-volt supply; referring again to FIG. 3 conductors 107 and 121 through a first diode CR6 and a second diode CR7, conductor 87, terminal 85, conductor 122, the now closed contacts of switch Z, conductor 125, the now closed contacts of the KCN relay, conductor 126, the coil of the KLN relay and conductor 123 which is connected by way of conductor 127 to the terminal 84 connected to the minus side of the 24-volt supply 12. Current flowing through the diodes CR6 and CR7 to energize the coil of the KLN relay produces a voltage drop which biases transistor Q1 to its conductive state. The output from the transistor charges the capacitor C1 to a peak voltage of about 35 volts. The plus side of the capacitor is connected to the plus side of the K1 relay by way of the conductive path established by R6, CR9, conductors 96, 97; (thence conductors 98, 16 as shown on FIG. 1A). As a result, the average voltage across the K1 relay coil is higher than the voltage across the KLN relay coil so that the K1 relay tends to pull in faster, assuming that the relays are identical. The voltage across the coil of relay KLN is about 24 volts and when the KLN relay coil locks in, upon closure of its number 2 contacts, the diodes CR6 and CR7 are short circuited by the path around them comprised of conductor 124, the closed number 2 contacts of the KLN relay, conductor 128, 126, the closed contacts of the KCN relay, conductor 125, the closed contacts of switch Z, conductor 122, which joins with conductor 87 at the righthand side of the series connected diodes CR6 and CR7. This removes the bias voltage from the base of transistor Q1 which in turn ceases to conduct. If by any chance the K1 relay of FIG. 1A has not locked in by way of its number 1 contacts, the capacitor C1 continues to supply current through conductors 96 and 97, etc., for a period of time. From the foregoing it will be understood that the energy stored in the capacitor C1 due to direct current pulses through the transistor Q1 (in the interval of time before the KLN relay locks in) serves to produce the increased potential applied on the positive side of the K1 relay coil during energization thereof upon an alarm condition and the capacitor C1 is the source of this additional current should the transistor cease to conduct before the lock-in circuit is established for the K1 relay. The two effects combined guarantee that the K1 relay pulls in on an alarm condition.

A pair of resistors R6 and R7 are employed, R6 being connected in series with the capacitor C1 and R7 being connected in parallel with the series combination of R6 and C1. These limit the charging current so that diode CR9 prevents the capacitor C1 from charging through one of the possible connections between the cathode of CR9 and the supply over paths leading to conductor 96. The diode CR8 prevents the capacitor C1 from forward biasing the collector to base junction of the transistor Q1 when the supply voltage from power supply 12 is below the voltage across capacitaor C1.

If a large number of lock-in relays should happen to be energized at the same time, the current is carried by the lock-in contacts. The diodes CR6 and CR7 need only be capable of passing sufficient current to energize one lock-in relay represented by the relay KLN and need not carry current to similar relays which may already be locked in. It has been found that a suitable value for the resistors R4 and R5 is 180 ohms each and a suitable value for the resistors R6 and R7 is 56 ohms each. The rating for the capacitor C1 should be 50 microfarads and have a breakdown voltage of no less than 55 volts.

In the diagram comprised of FIGS. 1A, 1B and 1C blocking diodes have been employed liberally; however, for purposes of explanation some have been ignored since their function is well understood by those skilled in the art and the same is true with respect to Zener diodes shown at various places in the minus circuitry of the input relays.

Figure 5:
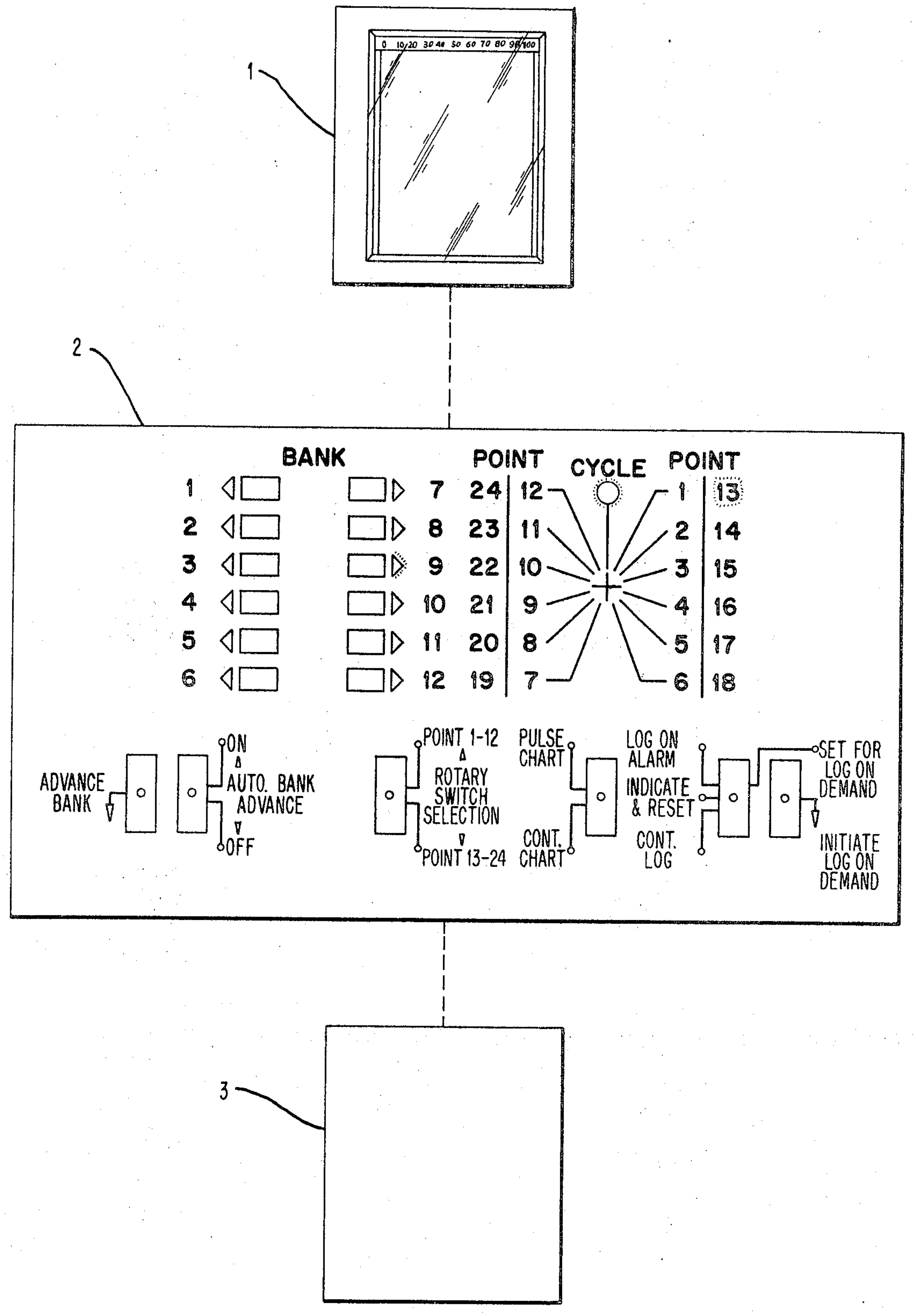
FIG. 5 shows a suitable arrangement of the recorder, programmer and banks of input relays of a complete system in accordance with applicants' invention.

The foregoing description of the operation of applicants' invention refers to use of a recorder manufactured by applicants' assignee and having features described in the aforementioned Pats. 3,195,141; 3,295,140; 3,317,913 and 3,396,404. In a practical embodiment of applicants' invention the system will employ many basic components including printed circuit cards, plug-in relays, and the like, connected by prewired cables having terminal plugs for interconnecting the various components as shown in U.S. Pat. 3,295,140. As shown in FIG. 5, three basic units are desirable: a recorder 1, a programmer 2, and two or more banks of input relays 3. These may be mounted in an instrument panel of conventional type or the recorder, programmer, and two or more banks of input relays may be mounted in one standard relay rack and additional banks of input relays mounted in one or more additional relay racks as required. In either case the units will be interconnected with standardized prewired cables.

While for purposes of description a 24 point recorder of the tipping printwheel type has been utilized, it will be appreciated that applicants' invention as claimed will have utility with other types of multipoint recorders provided with record distinguishing means and input switching operable in synchronism with the record distinguishing means for a fixed number of points to record many times the fixed number of points the recorder is designed to handle.

What is claimed is:

1. A multipoint-multibank recorder system comprising a multipoint recorder having chart-marking means, a point-selector switch cyclically operating in synchronism with said chart-marking means, a bank-selector switch, and a plurality of banks of input relays, the relays of each bank being energized in sequence through a path determined by a cycle of operation of the point-selector switch and a path through the bank-selector switch which is common to all relays of that bank for recording by the chart-marking means of points for each of the measured inputs to that bank and an identification point for that bank.

2. A system as in claim 1 including means effective upon energization of the last relay of each bank to advance the bank selector switch to another selected path thereof for recording of points of another bank and an identification point therefore.

3. A system as in claim 1 including means effective upon energization of the last relay of each bank to advance the bank selector switch by one or more steps for selection of another path for recording of inputs of and identification of the next or another subsequent bank.

4. A system as in claim 1 including means to move a chart of said multipoint recorder as a slow speed during recording of all except the first point of each bank, and means to move said chart at a faster speed during recording of the first point of each bank thereby to produce groups of recorded points for each bank with the group for one bank being spaced longitudinally along the length of the chart with respect to the group for another bank.

5. A system as in claim 1 including an isolation circuit for each bank of inputs sequentially connected to said recorder by said input relays of each of said plurality of banks of input relays and a bank identification circuit operable at a time of bank identification to effect displacement of said identification point, and the existence of an erroneously closed relay in the bank effecting an additional displacement of said bank identification point.

6. A system as in claim 1 including a sensing circuit to insure initiation of printing whenever an alarm point is encountered during a "log on alarm" mode of operation of said system.

7. A system as in claim 1 including means effective during a "log on demand" mode of operation of said system to initiate recording by said chart-marking means when said point-selector switch and said bank-selector switches are in position to begin the logging of information applied by a point 1 bank 1 relay of said plurality of banks of relays and terminate printing upon completion of recording points for all inputs connected in said system.

8. A multipoint-multibank recorder system comprising a multipoint recorder having a record producing means including:

means for producing a number of distinguishable records during a cycle of operation of said record producing means;

a first selector switch for establishing a plurality of conductive paths one after another in number corresponding to said number of distinguishable records produced during said cycle of operation of said record producing means, said first selector switch operating in synchronism with said record producing means;

a plurality of banks of input relays with the number of input relays in each bank corresponding in number to the total number of distinguishable records producible by said record producing means;

a second selector switch for establishing a plurality of conductive paths one after another in number corresponding to the number of banks in said plurality of banks; and each of said input relays of a bank of said banks being connectable, one after another through means preventing reverse current flow, and through a separate one of said conductive paths established by said first selector switch to complete an electrical connection to one side of a power supply during a time when the other side of said power supply is connected to all of said input relays of a bank by way of a conductive path established by said second selector switch means.

9. A system as in claim 8 wherein said means for producing a number of distinguishable records includes a printwheel having a plurality of characters disposed therearound for distinguishing a series of recorded points, and wherein said first selector switch is a rotary-selector switch having a wiper connected to one side of a power supply and driven in unison with said printwheel, a manually operable point selector switch having a plurality of circuit patterns and a plurality of brush contacts constructed and arranged for sequential connection one after the other of input relays of a bank of said plurality of banks of input relays upon operation of said rotary selector switch or continuous energization of any one of said relays of said bank upon operation of said rotary-selector switch, and wherein each relay of each bank of relays, connectable through said manual point selector switch, is connected through a diode matrix whereby a conductive path from said one side of a power supply is applied to energize said group of relays one after the other or one relay all of the time, and wherein said second selector switch is a stepping switch having a plurality of contacts, one for each bank, and a wiper, said wiper being connected to the opposite terminal of said power supply and by way of one of said plurality of contacts completing electrical connection for all of the relays of a single bank.

10. A system according to claim 9 wherein said stepping switch includes a second wafer having a plurality of points, one for each bank, and a wiper associated therewith moving together with the other wiper of said stepping switch, and means for connecting the wiper of said second wafer to the same side of said power supply as the wiper of said rotary selector switch for energizing bank lights as said stepping switch moves to effect connection at each of said plurality of its contacts which are representative of a bank.

11. A system according to claim 9 wherein said stepping switch has another wafer including a plurality of contacts one for each bank, means to energize each of these contacts simultaneously with energization of the corresponding numbered relay of said bank of input relays, and a normally deenergized measuring circuit relay which is energized through a circuit from an energized point of said another wafer through the wiper thereof when in contact with said energized point thereby to effect recording of a bank identification point.

12. A system as in claim 1 including:

a normally deenergized solenoid which when energized prevents marking of a recorder chart by said chart-marking means, a first relay normally deenergized which when energized deactivates said solenoid, a second relay normally energized effecting operation of chart drive means for said recorder at a slow speed and when deenergized effecting operation of said chart at a faster speed, and means associated with said point and said bank selector switches effective to deenergize said second relay at the beginning of a recording cycle for each bank thereby to increase the speed of operation of the recorder chart when the first relay of each bank is energized and thereafter immediately to reenergize said second relay to restore operation of said chart at slow speed thereby to effect recording of all of the inputs of a bank along substantially the same time line of the recorder chart.

References Cited

UNITED STATES PATENTS

| | | | |
|---|---|---|---|
| 2,549,401 | 4/1951 | Stein et al. | 346—34X |
| 2,743,986 | 5/1956 | Bradner | 346—46 |
| 3,196,449 | 7/1965 | Pelavin et al. | 346—34 |

JOSEPH W. HARTARY, Primary Examiner